United States Patent [19]

Takada et al.

[11] Patent Number: 5,736,247

[45] Date of Patent: Apr. 7, 1998

[54] COATED MOLDED ARTICLES OF OLEFIN RESIN

[75] Inventors: Ryoiti Takada; Kazuyuki Ohishi; Hiroshi Watarai; Yasuhiro Miyazima, all of Inazawa, Japan

[73] Assignee: Toyoda Gosei Co., Ltd., Aichi-ken, Japan

[21] Appl. No.: 777,572

[22] Filed: Dec. 31, 1996

Related U.S. Application Data

[63] Continuation of Ser. No. 363,551, Dec. 23, 1994, abandoned, which is a continuation-in-part of Ser. No. 137,741, Oct. 19, 1993, abandoned.

[30] Foreign Application Priority Data

Oct. 30, 1992 [JP] Japan .................................. 4-293505
Oct. 30, 1992 [JP] Japan .................................. 4-293520

[51] Int. Cl.$^6$ .................. B32B 27/30; B32B 27/32; B32B 27/40

[52] U.S. Cl. .................. 428/424.2; 428/423.7; 428/424.8

[58] Field of Search .................. 428/423.1, 423.3, 428/424.2, 424.4, 424.8, 423.7

[56] References Cited

U.S. PATENT DOCUMENTS

| | | | |
|---|---|---|---|
| 4,761,212 | 8/1988 | Watanabe et al. | 204/181.1 |
| 4,997,882 | 3/1991 | Martz et al. | 525/65 |
| 5,043,375 | 8/1991 | Henning et al. | 524/372 |

FOREIGN PATENT DOCUMENTS 4248845  9/1992  Japan .

*Primary Examiner*—D. S. Nakarani
*Attorney, Agent, or Firm*—Cushman, Darby & Cushman IP Group of Pillsbury, Madison & Sutro LLP

[57] ABSTRACT

A coated molded article including a body of an olefin resin and finish coat of an acrylic urethane resin paint, the paint includes a modified acrylic polyol resin produced by copolymerizing an acrylic resin with a polar group-introduced polyolefin and an acrylic polyol resin. Particularly, coated molded articles of an olefin resin can be used as exterior components for automobiles (e.g. side molding, bumper, wheel cap, etc.), as well as exterior components for buildings. These exterior components are required to have physical properties as article such as weather resistance, abrasion resistance and the like, while maintaining an attractive appearance.

11 Claims, 1 Drawing Sheet

| Finish Coat (plasticized acrylic urethane) | (i) modified acrylic polyol |
|---|---|
| | (ii) plasticized acrylic polyol |
| | (iii) polyester plasticized high polymer |
| Body (plasticized olefin) | |

FIGURE 1

| Finish Coat (plasticized acrylic urethane) | (I) modified acrylic polyol |
| --- | --- |
| | (II) plasticized acrylic polyol |
| | (III) polyester plasticized high polymer |
| Body (plasticized olefin) | |

FIGURE 2

| Finish Coat (rigid acrylic urethane) | (I) modified acrylic polyol |
| --- | --- |
| | (II) rigid acrylic polyol |
| Primer Coat | |
| Body (rigid olefin) | |

COATED MOLDED ARTICLES OF OLEFIN RESIN

This is a division of application Ser. No. 08/363,551, filed on Dec. 23, 1994, which was abandoned upon the filing hereof which in turn was a continuation-in-part of Application Ser. No. 08/137,741, filed on Oct. 19, 1993, now abandoned Priority application Nos. 4-293520 and 4-293505 filed in Japan on Oct. 30, 1992 are incorporated herein by reference.

BACKGROUND OF THE INVENTION

1. Field of the Invention

The present invention relates to a coated molded resin article in which a finish coat comprising an acrylic urethane resin paint has been formed on the body of the molded article of an olefin resin. Particularly, coated molded articles of the present invention can be used as exterior components for automobiles (e.g., side molding, bumper, wheel cap, etc.), as well as exterior components for buildings. These exterior components are required to have physical properties such as weather resistance, abrasion resistance and the like, while maintaining an attractive appearance.

2. Description of the Related Art

A list of main abbreviations used in the present invention is shown below:

TPE: thermoplastic elastomer
PB : polybutadiene
PO : polyolefin
PP : polypropylene
PS : polystyrene
HMDI : hexamethylene diisocyanate In the present invention, "coat-forming element" refers to a substance which is the main component of a coat. It does not necessarily refer to the component present in the largest amount, but refers to the component contributing to the fundamental physical properties of the coat.

Acrylic urethane resin is colorless and transparent (although it is colorable with pigments) and has good weather resistance. Thus, it has attracted attention as a coat-forming material for finishing paints applied to molded articles, including molded articles comprising plasticizing resin-containing bodies (e.g., the above-mentioned side molding, etc.) and molded articles comprising rigid resin-containing bodies (e.g., the above-mentioned wheel cap, etc.).

On the other hand, recent demands for weight reduction are promoting a study regarding the changing the molding material for molded articles comprising a plasticizing resin (e.g., the above-mentioned side molding, etc.) from conventional materials comprising plasticizing PVC (polyvinyl chloride) to materials comprising a plasticizing olefin resin such as styrene series TPE, olefin series TPE and 1,2-PB series TPE. Also, due to the same demand for weight reduction, molding material comprising a rigid olefin resin is used in many cases for molded articles comprising a rigid resin (e.g., the above-mentioned wheel cap, etc.).

However, the SP (solubility parameter) values of an olefin resin and acrylic urethane resin are largely different from each other, so that it is difficult to form a finish coat comprising an acrylic urethane resin paint on molded articles of an olefin resin by conventional methods. The SP value herein is defined as follows:

$$SP \text{ value} = (CED)^{1/2}$$
$$= \left(\frac{H-RT}{V}\right)^{1/2} [cal/cm^3]^{1/2}$$

wherein CED is a cohesive energy density, H represents an evaporation heat [cal/mol], T represents an absolute temperature [K], R represents a gas constant [cal/deg·mol] and V represents a volume per mole at a temperature [cm³/mol].

Because of this, measures conventionally taken are to rinse the body of a molded article comprising an olefin resin with TCE (1,1,1-trichloroethane) and then form a primer coat and then a finish coat (top coat) on the body. TCE rinsing is carried out to remove dirt from the surface of the substrate and to etch the surface.

The primer coat has been formed with a chlorinated PP paint, and the top coat has been formed with a cross-linkable acrylic polyol resin paint (for example, isocyanate-curable type paints).

The etching of the surface of the substrate with TCE improves adhesion of a coat because of unevenness at the surface. This improved adhesion is the result of an anchor effect or an increase in surface area. However, the use of TCE is being limited in light of environmental concerns. In order to obtain sufficient adhesion of the coat without using TCE, bonding itself between the coat and the substrate needs to be made firm. Lowering the degree of chlorination in the conventional primer coats such as a chlorinated PP paint improves the adhesion with a PP substrate but, on the other hand, makes poor the adhesion of the substrate with the top coat.

The result of a study by the present inventors demonstrates that the sufficient adhesion of the top coat is difficult to obtain by merely applying the primer coat and top coat even if rinsing with an alcohol such as IPA (isopropyl alcohol) is carried out as usual or not.

The present inventors have found that the adhesion with the substrate and the like is improved by having a polar group-introduced polyolefin included by an acrylic urethane resin paint. Thus, the present inventors have studied the design of the paint considering the above finding in light of physical properties to complete the present invention.

SUMMARY OF THE INVENTION

An object of the present invention is to provide a coated molded article of an olefin resin in which a finish coat (top coat) comprising an acrylic urethane resin exhibiting good adhesion without TCE rinsing has been formed on a molded article comprising a plasticizing or rigid olefin resin.

Another object of the present invention is to provide a coated molded article comprising a body of a molded article, which comprises a plasticizing olefin resin, and a finish coat (top coat) of an acrylic urethane resin paint comprising a plasticizing acrylic polyol resin and a modified acrylic polyol resin produced by copolymerizing a polar group-introduced polyolefin and a plasticizing acrylic polyol resin.

One embodiment of the present invention is a coated molded article formed with a body comprising a plasticizing olefin resin in which a finish coat comprising an acrylic urethane resin paint has been directly formed on the body of the molded article, wherein the acrylic urethane resin paint comprises (i) as a main component a modified acrylic polyol resin produced by copolymerizing a plasticizing acrylic polyol resin with a polar group-introduced polyolefin and (ii) as a first sub-component a plasticizing acrylic polyol resin and (iii) as a second sub-component a plasticizing polyester-containing polymer.

Another embodiment of the present invention is a coated molded article comprising a body formed with a rigid olefin resin, a finish coat (top coat) comprising a rigid acrylic urethane resin paint, and a primer coat interposed between the finish coat and the body of the molded article. The coat-forming element of the finish coat is a rigid acrylic urethane resin paint compromising as a main component a modified acrylic polyol resin produced by copolymerizing an acrylic polyol resin with a polar group-introduced polyolefin and as a sub-component a rigid acrylic polyol resin. The primer coat is formed between the body of the molded article and the finish coat. The coat-forming element of the primer coat is a modified polyolefin resin comprising as a main component a modified acrylic polyol resin produced by copolymerizing an acrylic polyol resin with a polar group-introduced polyolefin, and as a sub-component a polar group-introduced polyolefin.

BRIEF DESCRIPTION OF THE DRAWINGS

FIG. 1 is an example of one embodiment of a coated molded article wherein the olefin resin constituting the body of the molded article comprises a plasticizing olefin resin; and FIG. 2 is an example of one embodiment of a coated molded article wherein the olefin resin constituting the body of the molded article comprises a rigid olefin resin.

PREFERRED EMBODIMENTS OF THE INVENTION

In the following description, mixing unit and mixing ratio are by weight unless otherwise stated.

Molded articles of the present invention may be formed with a plasticizing olefin resin or a rigid olefin resin.

The plasticizing olefin resin refers usually to a TPE having a hardness of about 90 or less in terms of hardness ($H_s$) defined in JIS A, and includes plasticizing high polymers of a styrene series, olefin series and 1,2-PB series. Particularly, PS-polyethylene/polybutylene-PB (usually abbreviated as SEBS) among the styrene series plasticizing high polymers is preferred because it is superior in strength and provides superior adhesion of the coat as compared with other plasticizing olefin resins.

The rigid olefin resin includes crystalline PP (polypropylene), HDPE (high-density polyethylene), super-high-molecular-weight PE (polyethylene), crosslinked PE and modified polyolefin resins thereof having a Rockwell hardness of 100 or more in R scale. Further, the rigid olefin resin may contain reinforcing inorganic filler such as glass fiber, talc and the like.

When an inorganic filler such as glass fiber, etc. is used, it usually has been subjected to silane coupling treatment to improve miscibility with the olefin resin and adhesion of the top coat.

The molding method includes general-purpose injection molding, extrusion molding, compressive molding, vacuum molding and the like, but it is not particularly limited to these methods.

The finish coat is formed with an acrylic urethane resin paint comprising a plasticizing acrylic polyol resin and a modified acrylic polyol resin produced by copolymerizing a polar group-introduced polyolefin and a plasticizing acrylic polyol resin.

(I) When the olefin resin constituting the body of the molded article is a plasticizing olefin resin, the acrylic urethane resin paint for the finish coat is directly coated onto the body of the molded article. In this case, the paint is preferably a plasticizing acrylic urethane resin paint comprising the above-mentioned modified acrylic polyol resin, the above-mentioned plasticizing acrylic polyol, and a plasticizing polyester-containing polymer.

From the standpoint of contribution to the fundamental physical properties of the paint, the main component of the paint is the modified acrylic polyol resin, and the sub-components are the plasticizing acrylic polyol resin and the plasticizing polyester-containing polymer. However, this does not always mean that the main component is present in the largest amount in the paint.

The ratio of the main component and sub-components varies depending on the molding material selected for the body of the molded article, the modified acrylic polyol resin and the sub-components, as well as the physical properties required for the coat. In the case of the side molding, however, the ratio of the modified acrylic polyol resin to plasticizing acrylic polyol resin to plasticizing polyester-containing polymer is usually 4:3:3 to 8:1:1, and preferably 5:1:1.

The modified acrylic polyol resin is the main component of the coat, acting to enhance the adhesion of the coat to the substrate. The modified acrylic polyol resin is obtained by graft-copolymerizing the following plasticizing acrylic polyol resin onto the following polar group-introduced polyolefin by conventional methods.

The grafting ratio varies depending on the plasticizing acrylic polyol resin, the polar group and the introduction rate of the polar group. For example, when the plasticizing acrylic polyol resin is of a polyisocyanate-crosslinkable type, the polar group-introduced polyolefin is a chlorinated PP having a chlorination rate of 10 to 20%, and the former is graft-copolymerized onto the later, and the ratio of the plasticizing acrylic polyol resin to chlorinated PP is 60:40 to 95:5, and preferably 80:20.

The plasticizing acrylic polyol resin can be of the general-purpose plasticizing type used as components of paints for exterior components for automobiles. There can be used those which are obtained by homopolymerization of one member selected from the group consisting of non-functional acrylic monomers for plasticizing resins and functional acrylic monomers for crosslinking, or copolymerization of two or more members selected from the same group. However, the crosslinkable acrylic monomers are desirable in view of the abrasion resistance of the coat.

The non-functional acrylic monomers for plasticizing resins include hexyl methacrylate, lauryl methacrylate, methyl acrylate, ethyl acrylate, butyl acrylate, isobutyl acrylate, 2-ethylhexyl acrylate and the like.

The functional acrylic monomers for crosslinking include (1) acid type monomers (e.g., acrylic acid, methacrylic acid), (2) hydroxyl type monomers (e.g., hydroxyethyl acrylate, hydroxyethyl methacrylate, hydroxypropyl methacrylate), (3) amide type monomers (e.g., acrylamide, methacrylamide) and (4) glycidyl type monomers (e.g., glycidyl acrylate, glycidyl methacrylate).

The polar group-introduced polyolefin can be of the general-purpose type, for example, chlorinated PP, carboxyl group-introduced PP, epoxy group-introduced PP, amino group-introduced PP and the like. As to the proportion of the polar group introduced into the polyolefin, a chlorination degree of 10 to 20% is preferred in the case of, for example, chlorinated PP.

The plasticizing acrylic polyol resin sub-component acts to improve the solvent resistance and weather resistance of the coat. There can properly be used those which are the same as or different from that used in producing the above-mentioned modified acrylic polyol resin if the acrylic polyol resin is of the plasticizing type.

The plasticizing polyester-containing polymer acts to increase the flexibility of the coat, and can be any of the polyester-polyether type or the polyester-polyester type. The former comprises a hard segment composed of a polyester such as polybutylene terephthalate, etc. and a soft segment composed of a polyether such as polytetramethylene glycol ether (PTMG), PTMEGT (a condensate of PTMG with terephthalic acid), etc. The latter comprises a hard segment composed of the same polyester as above and a soft segment composed of an aliphatic polyester such as polycaprolactone, etc.

A method for producing the coated molded article of the present invention is illustrated below.

The molded article of PO previously prepared is rinsed with an alcohol (e.g. IPA, etc.). This rinsing is not always necessary if the molded article is clean.

A finish-coat paint is then coated onto the body of the molded article. The physical state of this finish-coat paint is not critical if the paint can form the finish coat. That is, the physical state may be any of the forms of solution, suspension, emulsion, powder and the like. Also, the coating method can be selected from brushing, dip-coating, spray-coating, electrostatic coating, electrodeposition and the like according to the physical state of the paint. The paint may be previously blended with a coloring agent, antioxidant, levelling agent and the like which are incorporated into common paints.

The coated molded article of the present invention, as described later in the examples, improves the adhesion of the paint even if TCE rinsing is not performed and primer coating is not applied.

In the coated molded article of the present invention, the finish coat is an acrylic urethane resin paint comprising (i) a modified acrylic polyol resin produced by copolymerizing a plasticizing acrylic polyol resin with a polar group-introduced polyolefin, (ii) a plasticizing acrylic polyol resin and (iii) a plasticizing polyester-containing polymer. The aforementioned finish coat displays improved adhesion to the body, which comprises a plasticizing olefin resin, even if TCE rinsing is not performed as a pre-treatment and a primer coat is not present between the finish coat and the body of the molded article. Therefore, the ease of producing coated molded articles comprising a plasticizing olefin resin-containing body is improved.

In the present invention, it is also possible to use a regenerated blend material recovered from previously produced molded articles, for example, articles with PP as a core material and SEBS as a covering material, as a material for the body of the molded article. In this case, the present invention contributes to the saving of resources.

(II) When the olefin resin constituting the body of the molded article is a rigid olefin resin, the acrylic urethane resin paint for the finish coat (top coat) is preferably a rigid acrylic urethane resin paint comprising (i) a modified acrylic polyol resin produced by copolymerizing an acrylic polyol resin with a polar group-introduced polyolefin and (ii) a rigid acrylic polyol resin.

In this case, it is desirable to use a primer coat between the body of the molded article formed with a rigid olefin resin and the finish coat.

The primer coat comprises a modified polyolefin resin comprising (i) a modified acrylic polyol resin produced by copolymerizing an acrylic polyol resin with a polar group-introduced polyolefin and (ii) a polar group-introduced polyolefin.

In this case, in view of contribution to the fundamental physical properties of the paint, the modified acrylic polyol resin is the main component of the paint, and the polar group-introduced polyolefin is a sub-component thereof. However, this does not always mean that the main component is present in the largest amount in the paint.

The ratio of the main component and sub-component varies depending on the modified acrylic polyol resin and the polar group-introduced polyolefin, but generally the ratio of the former to latter is usually 4:6 to 8:2.

The above-mentioned modified acrylic polyol resin is obtained by graft-copolymerizing the following acrylic polyol resin onto the following polar group-introduced polyolefin by conventional methods. The grafting ratio varies depending on the acrylic polyol resin and the polar group selected, and the introduction rate of the polar group. For example, when the polar group-introduced polyolefin is a chlorinated PP having a chlorination rate of 10 to 20%, the ratio of the acrylic polyol resin to chlorinated PP is 7:3 to 9:1, and preferably 8:2.

The acrylic polyol resin can be of the general-purpose type used as components of paints for exterior components for automobiles. There can be used those which are obtained by homopolymerization of one member selected from the group consisting of the following non-functional acrylic monomers for rigid resins, non-functional acrylic monomers for plasticizing resins and functional acrylic monomers for crosslinking, or copolymerization of two or more members selected from the same group.

The non-functional acrylic monomers for rigid resins include styrene, methyl methacrylate, ethyl methacrylate, butyl methacrylate, isobutyl methacrylate and the like.

The non-functional acrylic monomers for plasticizing resins include hexyl methacrylate, lauryl methacrylate, methyl acrylate, ethyl acrylate, butyl acrylate, isobutyl acrylate, 2-ethylhexyl acrylate and the like.

The functional acrylic monomers for crosslinking include (1) acid type monomers (e.g., acrylic acid, methacrylic acid), (2) hydroxyl type monomers (e.g., hydroxyethyl acrylate, hydroxyethyl methacrylate, hydroxypropyl methacrylate), (3) amide type monomers (e.g., acrylamide, methacrylamide) and (4) glycidyl type monomers (e.g., glycidyl acrylate, glycidyl methacrylate).

The polar group-introduced polyolefin includes general-purpose ones, for example, chlorinated PP, carboxyl group-introduced PP, epoxy group-introduced PP, amino group-introduced PP and the like. As to the proportion of the polar group introduced into the polyolefin, a chlorination degree of 10 to 20% is preferred in the case of, for example, chlorinated PP.

When the body of the molded article comprises a glass fiber-reinforced resin, it is desirable to incorporate a silane coupling agent into the primer coat to improve adhesion of the primer coat.

In the case of a molded article of a rigid olefin resin, the finish coat comprises a rigid acrylic urethane resin paint comprising (i) a modified acrylic polyol resin produced by copolymerizing an acrylic polyol resin with a polar group-introduced polyolefin and (ii a rigid acrylic polyol resin.

The modified acrylic polyol resin is the same as that which is used in the modified polyolefin resin which is the coat-forming component of the above primer coat, and other modified acrylic polyol resins which can be used in its place. It is, however, preferred in view of abrasion resistance, etc. to select crosslinkable types such as isocyanate-curable types, etc.

The ratio of the modified acrylic polyol resin main component to the acrylic polyol resin sub-component, which has a molecular weight of 10,000–20,000 and is a different resin from the main component, varies depending upon the types of resins selected. Usually, however, the ratio of the former to latter is 5:5 to 8:2, and preferably 1:6.

A method for producing the above coated molded article will be illustrated.

The molded article of polyolefin (PO) previously prepared is rinsed with an alcohol (e.g. IPA, etc.). This rinsing is not always necessary if the molded article is clean.

A primer paint and a finish paint (top paint) are then successively coated onto the body of the molded article. The physical state of this primer paint is not critical if the paint can form the primer coat. That is, the physical state may be any of the forms of solution, suspension, emulsion, powder and the like. Also, the coating method can properly be selected from brushing, dip-coating, spray-coating, electrostatic coating, electrodeposition and the like according to the physical state of the paint. The paint may be previously blended with a coloring agent, an antioxidant, a levelling agent and the like which are incorporated into common paints.

The coated molded article thus obtained, as described later in the examples, exhibits improved adhesion between the paint and the article body, even if TCE rinsing is not performed.

In the coated molded article of the present invention comprising a body having a rigid olefin resin, the primer coat is a modified polyolefin resin comprising (i) a modified acrylic polyol resin produced by grafting an acrylic polyol resin onto a polar group-introduced polyolefin and (ii) the polar group-introduced polyolefin. The top coat is rigid acrylic urethane resin paint comprising (i) a modified acrylic polyol resin produced by copolymerizing an acrylic polyol resin with a polar group-introduced polyolefin and (ii) the acrylic polyol resin. Thus, it becomes possible to form the top coat of the acrylic urethane resin which exhibits improved adhesion to the molded article body comprising the rigid olefin, even if TCE rinsing is not performed as pre-treatment.

The present invention will be illustrated in more detail with reference to the following examples and comparative examples.

EXAMPLES

Example 1 and Comparative Example 1

The present invention will be illustrated specifically according to the embodiment described in (I).

(1) Preparation of the test sample (a) The side molding (body of a molded article) of an automobile was prepared by injection molding using SEBS (RABARON produced by Mitsubishi Petrochemical Co., Ltd.) as a molding material.

(b) The body of the molded article was rinsed as shown in Table 1, and in the case of Comparative Example 1, the primer paint of the following composition was spray-coated onto the body so that the dry film thickness was 10 μm and air-dried to obtain a primer coat.

Composition of primer paint (Comparative Example 1):

| Chlorinated PP (amino group-terminated acrylic resin; chlorination degree, 25%) | 28% |
|---|---|
| Pigment (gray; titanium oxide type) | 4% |
| Solvent (toluene or xylene) | 61% |
| Additive (calcium carbonate) | 1% |
| Curing agent (buret-type HMDI) | 6% |

(c) In the case of Example 1, the top-coat paint of the following composition was directly spray-coated onto the molded article, and in the case of Comparative Example 1, the top-coat paint of the following composition was spray-coated onto the primer coat so that the dry film thickness was 20 μm in each case. Thereafter, heat treatment was carried out under conditions of 80° C.×30 min to form the top coats.

Composition of top-coat paint (Example 1):

| Modified acrylic polyol resin produced by graft-copolymerizing a plasticizing acrylic polyol resin onto a chlorinated PP (chlorination degree, 10 to 20%) in a ratio of the former to latter ratio of 8:2 | 21.4% |
|---|---|
| Plasticizing acrylic polyol resin | 4.3% |
| Plasticizing polyester-containing polymer | 4.3% |
| Pigment (aluminum paste) | 3.4% |
| Solvent (toluene or xylene) | 56% |
| Additive (calcium carbonate) | 0.9% |
| Ultraviolet ray absorber | 0.6% |
| Curing agent (adduct-type HMDI) | 9.1% |

Composition of top-coat paint (Comparative Example 1):

| Polyester-containing acrylic resin | 27.7% |
|---|---|
| Pigment (aluminum paste) | 3.5% |
| Solvent (toluene or xylene) | 60.9% |
| Additive (calcium carbonate) | 0.4% |
| Curing agent (buret-type HMDI) | 7.5% |

(2) Testing method

The adhesion of the coat was examined by a testing method for paints (grid taping test) according to JIS K5400. The results are shown in Table 1. In the case of the present invention, it can be seen that the adhesion of the coat is improved even if TCE rinsing is performed or not and without interposition of the primer coat.

TABLE 1

Results of coat adhesion test

|  | Example 1 | | Comparative Example 1 | |
|---|---|---|---|---|
|  | First | Second | First | Second |
| TCE rinsing (steam) | 0/100 | 0/100 | 0/100 | 0/100 |
| TPA rinsing (wiping) | 0/100 | 0/100 | 40/100 | 60/100 |
| No rinsing | 0/100 | 0/100 | 100/100 | 100/100 |

Note:
First: Adhesion examined on the test piece after coating.
Second: Adhesion examined on the test piece after 40° C. × 240 hours.
n/100: Number of the squares peeled off of the test piece by the first taping.

Example 2 and Comparative Example 2

The present invention will be illustrated specifically according to the embodiment described in (II).

9

(1) Preparation of the test sample (a) The wheel cap (body of a molded article) of an automobile was prepared by injection molding using a rigid PP molding material having the following composition:

| | |
|---|---|
| Crystalline PP | 100 parts |
| Silane coupling-treated glass-fiber | 20 parts |

(b) The body of the molded article was rinsed as shown in Table 1. The respective primer paints of the following compositions for Example 2 and Comparative Example 2 were spray-coated onto the body so that the dry film thickness was 10 μm in each case, and air-dried to form primer coats.

Composition of primer paint (Example 2):

| | |
|---|---|
| Modified acrylic polyol resin produced by graft-copolymerizing a rigid acrylic polyol resin onto a chlorinated PP (chlorination degree, 10 to 20%) in a ratio of the former to latter of 8:2 | 21.6% |
| Chlorinated PP (equimolar mixture of two kinds of chlorinated PP having chlorination degrees of 10 to 20% and 20 to 30%, respectively) | 4.8% |
| Pigment (gray; titanium oxide type) | 10.1% |
| Solvent (toluene or xylene) | 61.1% |
| Additive (calcium carbonate) | 1.4% |
| Silane coupling agent | 1.0% |

Composition of primer paint (Comparative Example 2):

| | |
|---|---|
| Chlorinated PO (blend of a modified chlorinated PO and a urethane series PO; chlorination degree, 25%) | 24.3% |
| Pigment (gray; titanium oxide series pigment) | 15.6% |
| Solvent (hydrocarbon solvent) | 60.0% |
| Additive | 0.1% |

(c) The respective top paints of the following compositions for Example 2 and Comparative Example 2 were spray-coated onto the above primer coats so that the dry film thickness was 20 μm in each case, and then heat-treated under conditions of 80° C.×15 min to form the top coats.

Composition of top paint (Example 2):

| | |
|---|---|
| Modified acrylic polyol resin produced by graft-copolymerizing a rigid acrylic polyol resin onto a chlorinated PP (chlorination degree, 10 to 20%) in a ratio of the former to the latter of 8:2 | 12.5% |
| Rigid acrylic polyol resin | 18.7% |
| Pigment (aluminum paste) | 3.5% |
| Solvent (toluene or xylene) | 55.6% |
| Additive (calcium carbonate) | 3.0% |
| Curing agent (adduct-type hexamethylene diisocyanate) | 6.7% |

Composition of top paint (Comparative Example 2):

| | |
|---|---|
| Isocyanate-curable acrylic polyol resin | 27.3% |
| Pigment (aluminum paste) | 23.0% |
| Solvent (toluene or xylene) | 42.5% |
| Additive (calcium carbonate) | 0.4% |
| Curing agent (buret-type hexamethylene diisocyanate) | 6.8% |

(2) Testing method

The adhesion of the coat was examined by measuring the peeling strength of the coat according to the following method. The results are shown in Table 2. In the case of the present invention, it can be seen that the adhesion of the coat is improved even if TCE rinsing is performed or not.

10

A paint of the same series as above (Sofrex 200 produced by Kansai Paint Co., Ltd.) was coated onto the top coat so that the coat on the substrate had a thickness of 100 μm. After standing at room temperature for one week, the 180-degree peeling test was carried out with an autographic instrument. The test conditions were as follows: width, 1 cm; tensile speed, 50 mm/min; and chart speed, 50 mm/min.

TABLE 2

Results of coat peeling test

| Test piece Pre-treatment | Example 2 | Comparative Example 2 |
|---|---|---|
| TCE rinsing | 1100 g/cm | 610 g/cm |
| TPA rinsing | 1000 g/cm | 300 g/cm |
| No rinsing | 900 g/cm | 200 g/cm |

Note: g/cm = load in gram required to peel a coat of 1 cm in width off a substrate

What is claimed is:

1. A coated molded article comprising:
   (a) a body of a molded article comprising a plasticizing olefin resin; and
   (b) a finish coat consisting essentially of an acrylic urethane resin paint formed from a composition consisting essentially of:
      (i) graft copolymer comprising a polar group-introduced polyolefin as a main backbone chain and a plasticizing acrylic polyol resin as a side chain;
      (ii) a plasticizing acrylic polyol resin;
      (iii) a plasticizing polyester-containing polymer; and
      (iv) hexamethylene diisocyanate, the finish coat being formed directly on the body of the molded article.

2. A coated molded article according to claim 1, wherein the ratio of the graft copolymer to the plasticizing acrylic polyol resin to the plasticizing polyester-containing polymer is in a range of 4:3:3 to 8:1:1.

3. A coated molded article according to claim 1, wherein the polar group-introduced polyolefin is a chlorinated polypropylene.

4. A coated molded article according to claim 3, wherein the ratio of the plasticizing acrylic polyol resin to chlorinated polypropylene is in a range of 60:40 to 95:5.

5. A coated molded article according to claim 1, wherein the plasticizing olefin resin is a styrene-containing thermoplastic elastomer.

6. A coated molded article comprising:
   (a) a body of a molded article comprising a rigid olefin resin having a Rockwell hardness of 100 or more in R scale;
   (b) a primer coat consisting essentially of a modified polyolefin resin consisting essentially of:
      (i) a graft-copolymer comprising a polar group-introduced polyolefin as a main backbone chain and an acrylic polyol resin as a side chain; and
      (ii) a polar group-introduced polyolefin;
   (c) a finish coat consisting essentially of a rigid acrylic urethane resin paint formed from a composition consisting essentially of:
      (i) a modified acrylic polyol resin comprising an acrylic polyol resin and a polar group-introduced polyolefin;
      (ii) an acrylic polyol resin; and
      (iii) hexamethylene diisocyanate, the primer coat being interposed between the body of the molded article and the finish coat.

7. A coated molded article according to claim 6, wherein the ratio of the graft copolymer in the primer coat to the polar group-introduced polyolefin in the primer coat is in a range of 4:6 to 8:2.

8. A coated molded article according to claim 6, wherein the ratio of the modified acrylic polyol resin in the finish coat to the acrylic polyol resin in the finish coat is in a range of 5:5 to 8:2.

9. A coated molded article according to claim 6, wherein the polar group-introduced polyolefin in the primer coat is a chlorinated polypropylene, and wherein the ratio of the graft copolymer in the primer coat to the chlorinated polypropylene in the primer coat is in a range of 7:3 to 9:1.

10. A coated molded article according to claim 6, wherein the rigid olefin resin has been reinforced with a glass fiber and the primer coat contains a silane coupling agent.

11. A coated molded article according to claim 6, wherein at least one of the polar group-introduced polyolefin in the primer coat and the polar group-introduced polyolefin in the finish coat is a chlorinated polypropylene.

* * * * *